(12) United States Patent
Chen et al.

(10) Patent No.: US 11,748,799 B2
(45) Date of Patent: Sep. 5, 2023

(54) METHOD, MEDIUM, AND SYSTEM FOR INFORMATION RECOMMENDATION

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Sicong Chen, Beijing (CN); Hai Yu, Beijing (CN)

(73) Assignees: BEIJING JINGDONG SHANGKE INFORMATION TECHNOLOGY CO., LTD., Beijing (CN); BEIJING JINGDONG CENTURY TRADING, CO., LTD., Beijing (CN)

( * ) Notice: Subject to any disclaimer, the term of this patent is extended or adjusted under 35 U.S.C. 154(b) by 394 days.

(21) Appl. No.: 16/979,285

(22) PCT Filed: Mar. 11, 2019

(86) PCT No.: PCT/CN2019/077685
§ 371 (c)(1),
(2) Date: Sep. 9, 2020

(87) PCT Pub. No.: WO2019/174549
PCT Pub. Date: Sep. 19, 2019

(65) Prior Publication Data
US 2020/0402137 A1    Dec. 24, 2020

(30) Foreign Application Priority Data

Mar. 12, 2018 (CN) ................. 201810199781.X

(51) Int. Cl.
*G06Q 30/00* (2023.01)
*G06Q 30/0601* (2023.01)
*G06Q 30/0201* (2023.01)

(52) U.S. Cl.
CPC ..... *G06Q 30/0631* (2013.01); *G06Q 30/0201* (2013.01); *G06Q 30/0629* (2013.01); *G06Q 30/0643* (2013.01)

(58) Field of Classification Search
CPC .......... G06Q 30/0631; G06Q 30/0201; G06Q 30/0629; G06Q 30/0643
See application file for complete search history.

(56) References Cited

U.S. PATENT DOCUMENTS

2003/0105682 A1*  6/2003  Dicker ............... G06Q 30/0253
                                                    705/26.8
2008/0243817 A1* 10/2008  Chan .................... G06Q 30/02
                                                    707/999.005
(Continued)

FOREIGN PATENT DOCUMENTS

CN     103208073 A    7/2013
CN     104268155 A    1/2015
(Continued)

OTHER PUBLICATIONS

Katukuri, Jayasimha, et al. "Recommending similar items in large-scale online marketplaces." 2014 IEEE International Conference on Big Data (Big Data). IEEE, 2014. (Year: 2014).*
(Continued)

*Primary Examiner* — Matthew E Zimmerman
(74) *Attorney, Agent, or Firm* — Oblon, McClelland, Maier & Neustadt, L.L.P.

(57) ABSTRACT

Provided are an information recommendation method and apparatus. According to historical data, an information recommendation apparatus identifies a pair of matching items so as to determine a cross-category relationship of items; the item cross-category relationship is used to construct item match contexts; an item context portrait and a user context portrait are used to sort the match contexts; the items in the match contexts are sorted according to the feedback behav-
(Continued)

ior of the user concerning the items in the match contexts; the sorted match contexts are recommended to the user.

15 Claims, 2 Drawing Sheets

(56) References Cited

U.S. PATENT DOCUMENTS

2009/0089273 A1* 4/2009 Hicks ................ G06F 16/00
707/999.005
2015/0363798 A1* 12/2015 Aihara ............. G06Q 30/0201
705/7.29

FOREIGN PATENT DOCUMENTS

| CN | 105427125 A | 3/2016 |
| CN | 107256513 A | 10/2017 |

OTHER PUBLICATIONS https://careerfoundry.com/en/blog/data-analytics/what-is-bernoulli-distribution/ (Year: 2021).*

International Search Report dated Jun. 12, 2019 in PCT/JP2019/077685 filed on Mar. 11, 2019, 2 pages.

* cited by examiner

METHOD, MEDIUM, AND SYSTEM FOR INFORMATION RECOMMENDATION

CROSS-REFERENCE TO RELATED APPLICATIONS

The present application is based on and claims priority from CN application No. 201810199781.X, filed on Mar. 12, 2018, and the disclosure of this CN application is hereby incorporated by reference as a whole.

TECHNICAL FIELD

The present disclosure relates to the field of information processing, and in particular, to an information recommendation method and device.

BACKGROUND

When a user purchases goods through the e-commerce platform, there will be a need to purchase items belonging to different categories at the same time. In the related art, articles belonging to different categories are collocated manually to construct a collocation scenario. The user purchases cross-category items through the collocation scenario.

SUMMARY

According to a first aspect of an embodiment of the present disclosure, there is provided an information recommendation method, comprising: identifying pairs of matched items according to historical data to determine cross-category relationships of the items; constructing an item matching scene by using the cross-category relationships of the items; ranking the matching scene by using an item scene picture and a user scene picture; ranking the items in the matching scene according to the user's feedback behavior on the items in the matching scene; and recommending the ranked matching scene to the user.

In some embodiments, identifying pairs of matched items according to historical data comprises: determining a score of matching a first item a and a second item b according to the number of times $N_{ab}$ that the first item a and the second item b are jointly purchased in all users and the expected number of times $E_{ab}$ that the first item a and the second item b are simultaneously purchased; in a circumstance that the matching exceeds a predetermined threshold, the first item a and the second item b are taken as a pair of matched items.

In some embodiments, the score of matching the first item a and the second item b is a ratio of a difference between $N_{ab}$ and $E_{ab}$ to $f(E_{ab})$, where the function f is a predetermined transformation function.

In some embodiments, said constructing an item matching scene by using the cross-category relationships of the items comprises: performing aggregation processing on the cross-category relationships of the items so as to aggregate the items having a paired relationship in the same collection, thereby constructing an item matching scene.

In some embodiments, said ranking the matching scene by using an item scene picture and a user scene picture comprises: generating combined features of a user and a scene by means of the item scene picture and the user scene picture; and ranking the matching scene according to the coefficient of the combined features so as to preferentially recommend matching scenes with high user interest degrees to the user.

In some embodiments, ranking the items in the matching scene according to the user's feedback behavior on the items in the matching scene comprises: determining a corresponding score according to the user's feedback behavior on each item in the matching scene; and optimizing the normalized depreciation cumulative gain of the matching scene according to the score so as to improve the ranking of the items with high scores and reduce the ranking of the items with low scores.

According to a second aspect of an embodiment of the present disclosure, there is provided an information recommendation device, comprising: a cross-category relationship determination module configured to identify pairs of matched items according to historical data to determine a cross-category relationship of the items; a matching scene construction module configured to construct an item matching scene using the item cross-category relationship; a scene ranking module configured to rank the matching scene using the item scene feature and the user scene picture; an item ranking module configured to rank items in the matching scene according to the user's feedback behavior on each item in the matching scene; a recommendation module configured to recommend the ranked matching scenes to the user.

In some embodiments, the cross-category relationship determination module is configured to determine the match score of the first item a and the second item b as a function of a number of times $N_{ab}$ that the first item a and the second item b are jointly purchased in all users and the expected number of times $E_{ab}$ that the first item a and the second item b are simultaneously purchased; in a circumstance that the matching exceeds a predetermined threshold, the first item a and the second item b are taken as a pair of matched items.

In some embodiments, the cross-category relationship determination module is further configured to take a ratio of the difference between $N_{ab}$ and $E_{ab}$ to $f(E_{ab})$ as the match score of the first item a and the second item b, where the function f is a predetermined transformation function.

In some embodiments, the matching scene construction module is configured to perform aggregation processing on the cross-category relationship of the items so as to aggregate the items having a paired relationship in the same collection, thereby constructing an item matching scene.

In some embodiments, the scene ranking module is configured to generate combined features of the user and the scene by using the item scene picture and the user scene picture, and rank the matching scene according to a coefficient of the combined features, so as to preferentially recommend a matching scene with high user interest degree to the user.

In some embodiments, the item ranking module is configured to determine a corresponding score according to a feedback behavior of a user on each item in the matching scene, and optimize a normalized depreciation cumulative gain of the matching scene according to the score, so as to improve the ranking of items with high scores and reduce the ranking of items with low scores.

According to a third aspect of the embodiments of the present disclosure, there is provided an information recommendation device, comprising: a memory configured to store instructions; a processor coupled to the memory and configured to implement a method according to any of the embodiments described above based on instructions stored in the memory.

According to a fourth aspect of the embodiments of the present disclosure, there is provided a computer-readable storage medium which stores computer instructions that, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. It is obvious that the drawings in the following description are only some embodiments of the present disclosure, and for those skilled in the art, other drawings may be obtained according to these drawings without inventive effort.

DETAILED DESCRIPTION

Figure 1:
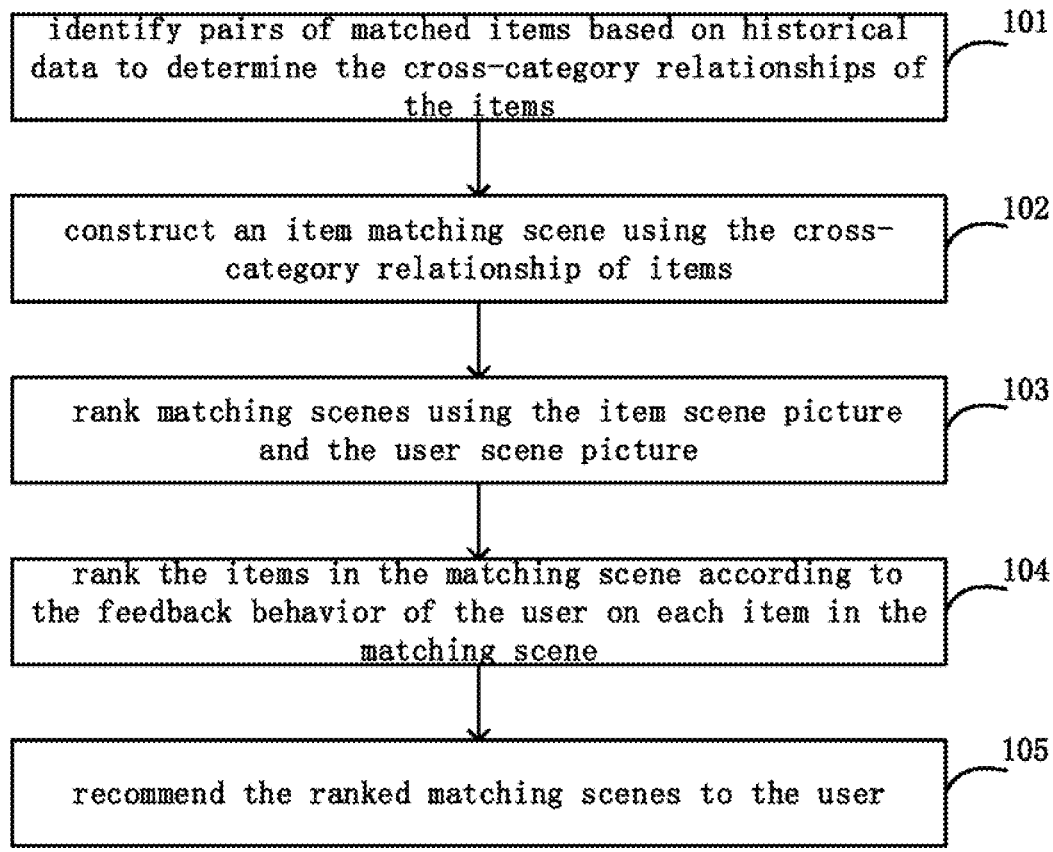
FIG. 1 is an exemplary flow chart of an information recommendation method of one embodiment of the present disclosure.

The technical solutions in the embodiments of the present disclosure will be described clearly and completely with reference to the drawings in the embodiments of the present disclosure, and it is obvious that the embodiments described are only some, instead of all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without paying inventive effort, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that, for the convenience of description, the sizes of the respective portions shown in the drawings are not drawn in an actual proportional relationship.

Techniques, methods, and devices known to one of ordinary skill in the relevant art may not be discussed in detail but are intended to be part of the authorization specification where appropriate.

In all examples shown and discussed herein, any particular value should be construed as exemplary only and not as limiting. Thus, other examples of the exemplary embodiments may have different values.

It should be noted that: similar reference numbers and letters represent similar items in the following figures, and thus, once an item is defined in one figure, it need not be discussed further in subsequent figures.

The inventors find that in the related art, the matching scene is constructed manually, and the items in the same matching are selected by operators according to experience. Due to the limited experience of the operating personnel, the items configured in the same matching scenario basically still belong to the same category or similar categories, and cannot meet the needs of users. In view of this, the present disclosure proposes an information recommendation scheme that can effectively aggregate cross-category matching products in the same matching scene, effectively improving the user experience.

FIG. 1 is an exemplary flowchart of an information recommendation method according to an embodiment of the present disclosure. In some embodiments, the method steps of the present embodiment may be performed by an information recommendation device.

In step 101, pairs of matched items are identified based on historical data to determine the cross-category relationships of the items.

In some embodiments, identifying pairs of matched items according to historical data comprises: determining the match score of the first item a and the second item b according to the number of times $N_{ab}$ that the first item a and the second item b are jointly purchased in all users and the expected times $E_{ab}$ that the first item a and the second item b are simultaneously purchased. In the case that the matching score exceeds a predetermined threshold, the first item a and the second item b are taken as a matching item pair.

$N_{ab}$ can be obtained directly by the following formula. Namely, $$N_{ab} = \text{support}(\text{buyers}_a \cap \text{buyers}_b)$$

In the above formula, $\text{buyers}_a$ represents the number of times all users purchased the item a, and $\text{buyers}_b$ represents the number of times all users purchased the item b. $N_{ab}$ indicates the number of times of purchasing both item a and item b among all users.

It is assumed that each purchase by a user is independent of each other and follows a Bernoulli distribution. When the items a, b do not have a correlation, $E_{ab}$ can be calculated by the probability of Bernoulli distribution. That is, $E_{ab}$ represents the expected number of times that items a and b are simultaneously purchased by all users when items a and b have no special relationship.

For example, all pairs of items purchased together by the user are candidate pairs for matching for a certain period of time. A correlation Score, $\text{Score}_{(a, b)}$, is calculated for each candidate pair. And the items pairs with the scores exceeding the threshold value are selected as the finally identified matched article pairs so as to ensure the reliability and the support degree of the result.

In some embodiments, the score of matching the first item a and the second item b is a ratio of the difference between $N_{ab}$ and $E_{ab}$ to $f(E_{ab})$. The function f is a predetermined transformation function. Namely:

$$\text{Score}_{(a,b)} = (N_{ab} - E_{ab})/f(E_{ab})$$

In the above formula, $f(E_{ab})$ is a function of $E_{ab}$, and can be set according to the mining target. For example, the function f may be an open root function, or an open n-th power function, etc. The purpose of using the function f is that if the denominator uses $E_{ab}$ directly, it may result in the denominator being too large (too strong a penalty). By performing transformation processing such as root opening processing on $E_{ab}$, the denominator can be in a reasonable range, and the punishment effect of the denominator on the whole score is weakened.

In step 102, an item matching scene is constructed using the cross-category relationship of items.

In some embodiments, an item collocation scenario is constructed by aggregating the across category relationship of items to aggregate items in a paired relationship in the same collection.

In some embodiments, after the cross-category relationship between the items is obtained, the relationship of the times may be described in the perspective of a graph. Each item may be considered a vertex of the graph, and the cross-category relationship of items may be considered an edge of the graph. The corresponding score is the weight of the edge. Sub-graphs are formed by mining collections of items in the whole item collections so as to aggregate the related relations among the items into a community form, namely an item matching scene.

Figure 2:
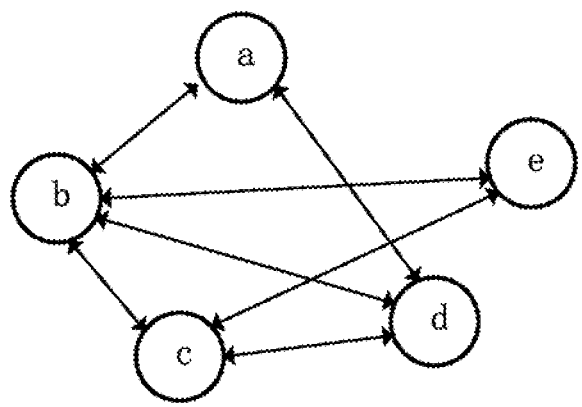
FIG. 2 is an exemplary diagram of an item cross-category relationship according to one embodiment of the present disclosure.

As shown in FIG. 2, for items a, b, c, d, and e, if there is a correlation between two items, they are represented by edges (short lines), and the score between the two items is the weight of the corresponding edge. Of course, if there is no correlation between two items, such as items a and e, there will be no edge between them.

In some embodiments, construction of the matching can be performed using an unsupervised learning method. For example, each item may be initially assigned a random scene number, and this scene number can be continuously propagated and iterated to obtain a scene to which the item belongs with higher reliability.

It should be noted that, since the unsupervised learning itself is not the inventive point of the present disclosure, the description thereof is not made here.

After the scene is obtained, the matching scene of shopping available on line can be obtained in a manual naming mode. In the present disclosure, manual intervention is only for manual naming and review before the scene goes online. The mining, filtering of the scene and the selection of items do not need manual intervention, and automatic updating can be performed periodically.

For example, for 8 items a, b, c, d, e, f, g, and h, the pairs of associated items are a→b, a→c, d→e, f→h, g→h, as can be seen from step 101 above. The 8 items were divided into 3 groups by aggregation treatment. Namely group a1 (a, b, c), group a2 (d, e) and group A3 (f, g, h). Group 1, group 2 and group 3 are thus treated as three different scenes.

For example, for the scene of "outdoor travel", a cross-category collection of items may be comprised through the above process, as shown in TABLE 1.

TABLE 1

| Items covered by the scene | Category to which the article belongs |
|---|---|
| Shoulder bag | Catergory of cases and bags |
| Alpenstock | Category of outdoor equipment |
| Sport coat | Catergory of clothes |
| Climbing boot | Catergory of shoes and boots |
| Travel food | Catergory of food categories |
| . . . | . . . |

For another example, for the scene "hot pot dinner", a cross-category collection of items may be comprised through the above-described processing, as shown in TABLE 2.

TABLE 2

| Items covered by the scene | Category to which the item belongs |
|---|---|
| Rinse pot | Catergory of kitchen tools |
| Food material | Catergory of fresh food |

TABLE 2-continued

| Items covered by the scene | Category to which the item belongs |
|---|---|
| Dipping source | Catergory of condiments |
| Table wine | Catergory of wine |
| . . . | . . . |

In step 103, matching scenes are ranked using the item scene picture and the user scene picture.

In some embodiments, a combined user and scene picture is generated using an item scene picture and a user scene picture. And the matching scenes are ranked according to the coefficient of the combined features so as to preferentially recommend a matching scene with a high user interest degree to the user.

For example, the item scene picture may comprise behavior data of a scene to which the item belongs, feedback data of the scene to which the item belongs, quality-related data of the item, correlation of the commodity with the scene, and other information. The user scene picture may comprise user interest characteristics of the scene, user picture characteristics, and the like.

In some embodiments, the item scene picture and the user scene picture are first learned by a strong learner to obtain a combined user-scene feature. In addition, weak classifiers can be further utilized to score according to the obtained combined features so as to obtain a coefficient of each combined features. And then the matching scenes are ranked according to the obtained coefficients. By combining the strong learner and the weak classifier, the method can not only have the accuracy of the strong learner, but also have the interpretability of the weak classifier, and the content and the relation of each combined feature are visual. Compared with the related technology, the present disclosure can automatically learn the combined features between the user and the item from the data, and are more suitable for the characteristic that the shopping scene is frequently updated.

For example, for three scenes, A1 (a, b, c), A2 (d, e), and A3 (f, g, h), by learning the item scene picture and the user scene picture by a strong learner and processing of a weak classifier, it is found that of these three scenes, the user is most interested in scene A2, and least interested in scene A3. Scenes A1, A2, and A3 can thus be ranked as A2, A1 and A3 according to the processing results of learning and ranking.

It should be noted that, since the strong learner and the weak classifier are not themselves the inventive point of the present disclosure, they are not explained in detail here.

In step 104, the items in the matching scene are ranked according to the feedback behavior of the user on each item in the matching scene, so as to optimize the collocation scenario.

In some embodiments, the corresponding score may be determined according to the user's feedback behavior for each item in the matching scene. And the NDCG (Normalized distributed Cumulative Gain) of the matching scene is optimized according to the score so as to improve the ranking of the items corresponding to the high score behavior and reduce the ranking of the items corresponding to the low score behavior.

For example, the corresponding score may be determined based on a user's actions of clicking on, purchasing, searching for, etc. the item. If the user has purchased the item, the user usually will not purchase it again in the short term, the corresponding score may be lowered in order to rank the item backwards. If the user has not purchased the item, but has clicked on, searched for, or browsed the item a lot, it indicates that the user has a higher interest level in the item, so the corresponding score may be increased to rank the item forward.

Generally, for recommended information, users always read from front to back. Therefore, if the items most interesting to the user can be moved forward, the user's purchasing efficiency can be effectively improved and the browsing time can be reduced. To this end, the overall ranking of items within a scene may be optimized. In some embodiments, the ranking of an item corresponding to a high score behavior may be increased and the raking of an item corresponding to the low score behavior may be reduced by using NDCG as an optimization target.

For example, for the three scenes A1 (a, b, c), A2 (d, e) and A3 (f, g, h), after ranking the matching scenes, it is found that the user has the highest interest level in the scene A2 and the lowest interest level in the scene A3. Scenes A1, A2, and A3 are thus ranked as A2, A1, and A3.

Next, taking NDCG as the optimization goal, personalized ranking is performed on the items in each scene, respectively, to get an optimized result. For example, for scene A1, the optimized ranking for items a, b, c is b, a, c. For scenario A2, the optimized ranking for items d, e is e, d. For scene A3, the optimized ranking of items h, g, f is f, g, h. The corresponding scenes and item ranking results are shown in TABLE 3.

TABLE 3

| Ranking | Scene content |
| --- | --- |
| 1 | A2 (e, d) |
| 2 | A1 (b, a, c) |
| 3 | A3 (h, g, f) |

Through the processing, scenes in which the user is interested can be ranked in front, and cross-category items which the user prefers to buy in each scene are ranked in front, so that the user experience can be effectively improved.

It should be noted that, since NDCG optimization itself is not the inventive point of the present disclosure, it is not explained in detail here.

In step 105, the ranked matching scenes are recommended to the user.

In the information recommendation method provided by the embodiment of the disclosure, cross-category related or matched commodities are aggregated and presented to a user in an optimized sequence, so that user experience and purchasing desire are effectively improved.

The present disclosure is illustrated below by way of a specific example.

First, cross-category relationships between items are identified. For example, an alpenstock matches a tent, a jacket matches goggles, hotpot condiments match beef balls, fat beef matches hotpot dipping source, etc. Then, aggregation processing is performed on the obtained cross-category relationship. For example, scene A (including commercial hiking sticks, tents, jackets, goggles) and scene B (including commercial hotpot condiment, beef balls, fat beef, hotpot dipping source) are obtained, among others. The two names of outdoor travel and hot pot dinner can be named manually. Next, the scenes are ranked according to the historical behavior of each user. For example, if the user a likes mountain climbing and dislikes hotpot, the scenes related to mountain climbing are ranked first, and the scenes related to hotpot are ranked as far back as possible. Finally, according to the behaviors of each user, the commodities in the scene are ranked, for example, if the user a prefers to buy the jacket and has bought an alpenstock, the jacket needs to be arranged in front of the jacket and the alpenstock needs to be arranged behind the jacket in the scene of mountain climbing. Therefore, cross-category information of the scene in which the user is most interested can be provided for the user, and user experience is improved.

Figure 3:
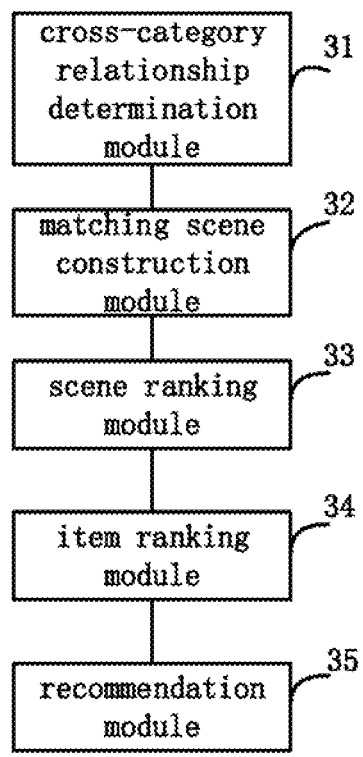
FIG. 3 is an exemplary block diagram of an information recommendation device of one embodiment of the present disclosure.

FIG. 3 is an exemplary block diagram of an information recommendation device according to an embodiment of the present disclosure. As shown in FIG. 3, the information recommendation device comprises a cross-category relationship determination module 31, a matching scene construction module 32, a scene ranking module 33, an item ranking module 34, and a recommendation module 35.

The cross-category relationship determination module 31 is configured to identify pairs of matched items from historical data to determine a cross-category relationship of items.

In some embodiments, the cross-category relationship determination module 31 determines the match score of the first item a and the second item b based on the number of times of $N_{ab}$ that the first item a and the second item b are purchased together among all the users, and the expected number of times $E_{ab}$ that the first item a and the second item b are purchased simultaneously. In the case where the score of matching exceeds a predetermined threshold, the cross-category relationship determination module 31 takes the first item a and the second item b as a matching item pair.

In some embodiments, the cross-category relationship determination module 31 takes a ratio of the difference between $N_{ab}$ and $E_{ab}$ to $f(E_{ab})$ as the score for matching the first item a and the second item b, where the function f is a predetermined transformation function. For example, the function f may be an open root function, or an open n-th function, etc.

The matching scene construction module 32 is configured to construct an item matching scene with item cross-category relationships.

In some embodiments, the matching scene construction module 32 aggregates the cross-category relationships of items to aggregate items with paired relationships in the same collection, thereby constructing an item matching scene.

In some embodiments, the construction of a matching scene can be performed using an unsupervised learning method. For example, each item may be initially assigned a random scene number, and this scene number can be continuously propagated and iterated to obtain a scene to which the item belongs with higher reliability.

The scene ranking module 33 is configured to rank the matching scenes with the item scene picture and the user scene picture.

In some embodiments, the scene ranking module 33 generates a combination feature of the user and the scene by using the item scene picture and the user scene picture, and ranks the matching scenes according to a coefficient of the combination feature, so as to preferentially recommend the matching scenes with high interest levels of the user to the user.

In some embodiments, the item scene picture and the user scene picture may be learned by a learner to obtain a combined user-scene feature. In addition, a weak classifier can be further utilized to score according to the obtained combined features so as to obtain a respective coefficient of each combined features. And then the matching scenes are ranked according to the obtained coefficients. By combining the strong learner and the weak classifier, the method can not only have the accuracy of the strong learner, but also have the interpretability of the weak classifier, and the content and the relation of each combined feature are visual. Compared with the related technology, the present disclosure can automatically learn the combined features between the user and the item from the data, and are more suitable for the characteristic that the shopping scene is frequently updated.

The item ranking module 34 is configured to rank the items in a matching scene according to the user's feedback behavior on each item in the matching scene, so as to optimize the matching scene.

In some embodiments, the item sorting module 34 determines a corresponding score according to the feedback behavior of the user on each item in the matching scene, and optimizes a normalized depreciation cumulative gain of the matching scene according to the score, so as to improve the ranking of items with high scores and reduce the ranking of items with low scores.

In some embodiments, the NDCG is taken as an optimization goal, and personalized ranking is performed on the list of items in each scene, so as to obtain an optimization result.

The recommending module 35 is configured to recommend the ranked matching scenes to the user.

In the embodiment of the information recommendation device of the present disclosure, the cross-category related or matched commodities are aggregated and presented to the user in an optimized sequence, so that the user experience and the purchase desire are effectively improved.

Figure 4:
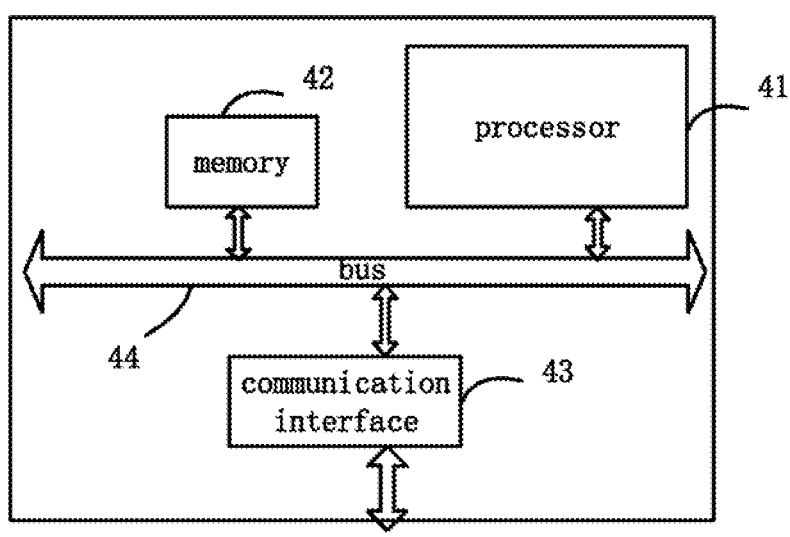
FIG. 4 is an exemplary block diagram of an information recommendation device according to another embodiment of the present disclosure.

FIG. 4 is an exemplary block diagram of an information recommendation device according to another embodiment of the present disclosure. As shown in FIG. 4, the information recommendation device comprises a memory 41 and a processor 42.

The memory 41 is used for storing instructions, the processor 42 is coupled to the memory 41, and the processor 42 is configured to execute the method according to any embodiment in FIG. 1 based on the instructions stored in the memory.

As shown in FIG. 4, the information recommendation device further comprises a communication interface 43 for information interaction with other devices. Meanwhile, the device further comprises a bus 44, and the processor 42, a communication interface 43 and the memory 41 are communicated with each other through the bus 44.

The memory 41 may comprise high-speed RAM memory, and may also comprise non-volatile memory, such as at least one disk memory. The memory 41 may also be a memory array. The storage 41 may also be partitioned into blocks, and the blocks may be combined into virtual volumes according to certain rules.

Further, the processor 42 may be a central processing unit CPU, or may be an application specific integrated circuit ASIC, or one or more integrated circuits configured to implement embodiments of the present disclosure.

The present disclosure also relates to a computer-readable storage medium which stores computer instructions that, when executed by a processor, implement the method according to any one of the embodiments illustrated by FIG. 1.

In some embodiments, the functional unit modules described above can be implemented as a general purpose Processor, a Programmable Logic Controller (PLC), a Digital Signal Processor (DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure.

By implementing the scheme provided by the present disclosure, at least one of the following beneficial effects can be obtained:

(1) The solution provided by the disclosure can automatically identify cross-class related commodities in hundred million-level massive commodities, automatically construct matching scenes for shopping, and rank and recommend the scenes. The solution covers so many commodities and updates in such a fast speed that it is far from being reachable by manual operation.

(2) The commodity correlation relationship constructed by the solution of the present disclosure can cover commodity related information of all dimensions. In contrast, manual operations are limited by the knowledge and experience of the operator, making it difficult to achieve the accuracy and versatility of the solution of the present disclosure.

(3) In the process of constructing the matching scene of commodities in the solution, the required manual intervention is only naming and online checking of a new scene, and the labor cost is greatly saved.

(4) The scenes constructed by the method can effectively cover cross-category commodities, and can remove alternative similar commodities, which is difficult to realize by traditional methods such as clustering and the like.

(5) The present disclosure provides a whole set of novel combinations of characteristics and ideas of ranking for a shopping scene. Compared with the traditional method, the present disclosure is more suitable for scene recommendation, and can obtain better accuracy and effect.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles and the practical application of the present disclosure, and to enable those of ordinary skill in the art to understand the disclosure to design various embodiments with various modifications suitable for particular uses.

What is claimed is:

1. An information recommendation method, comprising:
   identifying pairs of matched items according to historical data to determine cross-category relationships of the items;
   constructing item matching scenes by using the cross-category relationships of the items and using an unsupervised learning method;
   ranking the item matching scenes by using an item scene picture and a user scene picture, comprising:
   obtaining combined features of a user and a scene by means of learning the item scene picture and the user scene picture using a strong learner;
   obtain a coefficient of the combined features by using weak classifiers to score the obtained combined features; and
   ranking the item matching scenes according to the coefficient of the combined features;

ranking items in the item matching scenes according to a feedback behavior on the items in the item matching scene from a user; and recommending the ranked item matching scenes to the user.

2. The information recommendation method of claim 1, wherein the identifying pairs of matched items according to historical data comprises:

determining a score of matching a first item a and a second item b according to the number of times $N_{ab}$ the first item a and the second item b are jointly purchased by all users and the expected number of times $E_{ab}$, the first item a and the second item b are simultaneously purchased, wherein purchases by a user are independent from one another and follow a Bernoulli distribution, and the first item a and the second item b do not have a correlation; and taking the first item a and the second item b as a pair of matched items in a case that the matching exceeds a predetermined threshold.

3. The information recommendation method of claim 2, wherein the score of matching the first item a and the second item b is a ratio of a difference between $N_{ab}$ and $E_{ab}$ to $f(E_{ab})$, where the function f is a predetermined transformation function.

4. The information recommendation method of claim 1, wherein the constructing an item matching scene by using the cross-category relationships of the items comprises:

performing aggregation processing on the cross-category relationships of the items to aggregate the items having a paired relationship in a same collection, thereby constructing an item matching scene.

5. The information recommendation method of claim 1, wherein the ranking the items in the matching scene according to the user's feedback behavior on the items in the matching scene comprises:

determining a corresponding score according to the user's feedback behavior on each item in the matching scene; and improving the ranking of the items with high scores and reducing the ranking of the items with low scores according to the score.

6. An information recommendation device comprising:
a memory configured to store instructions;
a processor coupled to the memory, by executing instructions stored by the memory, the processor configured to implement the following steps:

identifying pairs of matched items according to historical data to determine cross-category relationships of the items;

constructing item matching scenes by using the cross-category relationships of the items and using an unsupervised learning method;

ranking the item matching scenes by using an item scene picture and a user scene picture, comprising:

obtaining combined features of a user and a scene by means of learning the item scene picture and the user scene picture using a strong learner;

obtain a coefficient of the combined features by using weak classifiers to score the obtained combined features; and ranking the item matching scenes according to the coefficient of the combined features;

ranking items in the item matching scenes according to a feedback behavior on the items in the item matching scene from a user; and recommending the ranked item matching scenes to the user.

7. A non-transitory computer readable storage medium, wherein the computer readable storage medium stores computer instructions which, when executed by a processor, implement the method of claim 1.

8. The information recommendation device according to claim 6, wherein the identifying pairs of matched items according to historical data comprises:

determining a score of matching a first item a and a second item b according to the number of times Nab the first item a and the second item b are jointly purchased by all users and the expected number of times Eab the first item a and the second item b are simultaneously purchased, wherein purchases by a user are independent from one another and follow a Bernoulli distribution, and the first item a and the second item b do not have a correlation; and taking the first item a and the second item b as a pair of matched items in a case that the matching exceeds a predetermined threshold.

9. The information recommendation device according to claim 8, wherein the score of matching the first item a and the second item b is a ratio of a difference between Nab and Eab to f(Eab), where the function f is a predetermined transformation function.

10. The information recommendation device according to claim 6, wherein the constructing an item matching scene by using the cross-category relationships of the items comprises:

performing aggregation processing on the cross-category relationships of the items to aggregate the items having a paired relationship in a same collection, thereby constructing an item matching scene.

11. The information recommendation device according to claim 6, wherein the ranking the items in the matching scene according to the user's feedback behavior on the items in the matching scene comprises:

determining a corresponding score according to the user's feedback behavior on each item in the matching scene; and improving the ranking of the items with high scores and reducing the ranking of the items with low scores according to the score.

12. A non-transitory computer readable storage medium, wherein the computer readable storage medium stores computer instructions which, when executed by a processor, implement the method of claim 2.

13. A non-transitory computer readable storage medium, wherein the computer readable storage medium stores computer instructions which, when executed by a processor, implement the method of claim 3.

14. A non-transitory computer readable storage medium, wherein the computer readable storage medium stores computer instructions which, when executed by a processor, implement the method of claim 4.

15. A non-transitory computer readable storage medium, wherein the computer readable storage medium stores computer instructions which, when executed by a processor, implement the method of claim 5.

* * * * *